US010902695B2

(12) United States Patent
Meyer

(10) Patent No.: US 10,902,695 B2
(45) Date of Patent: Jan. 26, 2021

(54) SPINNING REEL GAME WITH A SYNCHRONIZED SPINNING PRIZE REEL

(71) Applicant: Aristocrat Technologies Australia Pty Limited, North Ryde (AU)

(72) Inventor: Jason Meyer, Wyoming (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 15/927,858

(22) Filed: Mar. 21, 2018

(65) Prior Publication Data

US 2018/0276941 A1 Sep. 27, 2018

Related U.S. Application Data

(63) Continuation-in-part of application No. 15/694,959, filed on Sep. 4, 2017, now Pat. No. 10,733,832, and a continuation-in-part of application No. 29/616,091, filed on Sep. 1, 2017, now Pat. No. Des. 839,899.

(30) Foreign Application Priority Data

Mar. 22, 2017 (AU) ................................ 2017901012

(51) Int. Cl.

*A63F 9/24* (2006.01)
*A63F 13/00* (2014.01)
*G06F 17/00* (2019.01)
*G07F 17/32* (2006.01)
*G07F 17/34* (2006.01)

(52) U.S. Cl.

CPC ...... *G07F 17/3213* (2013.01); *G07F 17/3267* (2013.01); *G07F 17/34* (2013.01)

(58) Field of Classification Search

CPC ......................... G07F 17/3244; G07F 17/3202
See application file for complete search history.

(56) References Cited

U.S. PATENT DOCUMENTS

D341,848 S 11/1993 Bigelow et al.
5,584,764 A 12/1996 Inoue
5,927,714 A 7/1999 Kaplan
D470,857 S 2/2003 Anderson et al.
D479,243 S 9/2003 Ohashi et al.
D562,338 S 2/2008 Keohane
(Continued)

FOREIGN PATENT DOCUMENTS

GB 191402539 A 4/1914
GB 191412274 A 4/1920
(Continued)

OTHER PUBLICATIONS

Office Action, dated Oct. 5, 2018, for U.S. Appl. No. 15/694,959, filed Sep. 4, 2017.

(Continued)

*Primary Examiner* — Kang Hu
*Assistant Examiner* — Jason Pinheiro
(74) *Attorney, Agent, or Firm* — McAndrews, Held & Malloy, Ltd.

(57) ABSTRACT

A gaming machine having a first reel, and a set of second reels. The first reel has a plurality of prizes displayed at respective first display positions, and spins in a first direction. Each of the second reels is aligned with one of the first display positions, and spins in a second direction to identify one of the prizes.

21 Claims, 11 Drawing Sheets

(56) References Cited

U.S. PATENT DOCUMENTS

| | | | | |
|---|---|---|---|---|
| 7,381,134 | B2 | 6/2008 | Cuddy et al. | |
| 7,785,190 | B2 | 8/2010 | Aida | |
| D633,921 | S | 3/2011 | Brinda | |
| D677,326 | S | 3/2013 | Gleasman et al. | |
| D695,781 | S | 12/2013 | Edwards et al. | |
| 8,651,940 | B2 | 2/2014 | Loat et al. | |
| D749,108 | S | 2/2016 | Bauer et al. | |
| D772,240 | S | 11/2016 | Edstrom et al. | |
| D772,273 | S | 11/2016 | Spector | |
| D772,888 | S | 11/2016 | Jon et al. | |
| D772,920 | S | 11/2016 | Bauer | |
| D785,664 | S | 5/2017 | Yao et al. | |
| D786,271 | S | 5/2017 | Randon | |
| D791,802 | S | 7/2017 | Solop et al. | |
| D793,409 | S | 8/2017 | Berman et al. | |
| D797,764 | S | 9/2017 | Bouroullec et al. | |
| D819,042 | S | 5/2018 | Ebler et al. | |
| 2003/0094760 | A1 | 5/2003 | Motegi et al. | |
| 2004/0048645 | A1 | 3/2004 | Webb et al. | |
| 2007/0066389 | A1* | 3/2007 | Kojima | G07F 17/32 463/31 |
| 2007/0167223 | A1 | 7/2007 | Bleich et al. | |
| 2007/0277105 | A1 | 11/2007 | Lee et al. | |
| 2007/0293299 | A1 | 12/2007 | Aida | |
| 2008/0102928 | A1* | 5/2008 | Daley | G07F 17/32 463/20 |
| 2008/0113696 | A1 | 5/2008 | Owen et al. | |
| 2008/0274786 | A1 | 11/2008 | Wilson | |
| 2009/0124345 | A1* | 5/2009 | Gilmore | G07F 17/32 463/20 |
| 2011/0053678 | A1 | 3/2011 | Aida | |
| 2011/0136562 | A1 | 6/2011 | Loat et al. | |
| 2015/0018070 | A1 | 1/2015 | Meyer | |
| 2015/0302685 | A1 | 10/2015 | Carter et al. | |
| 2016/0093147 | A1 | 3/2016 | Penacho et al. | |
| 2016/0189471 | A1 | 6/2016 | Penacho et al. | |
| 2016/0217646 | A1 | 7/2016 | Hornik | |

FOREIGN PATENT DOCUMENTS

| | | | |
|---|---|---|---|
| GB | 364177 | A | 12/1931 |
| GB | 2106682 | A | 4/1983 |
| GB | 2106682 | B | 12/1984 |
| JP | H01209089 | A | 8/1989 |
| JP | H0639085 | A | 2/1994 |
| JP | H06238033 | A | 8/1994 |
| JP | H09234274 | A | 9/1997 |
| JP | H11114138 | A | 4/1999 |
| JP | 2920027 | B2 | 7/1999 |
| JP | H11309238 | A | 11/1999 |
| JP | 2000037501 | A | 2/2000 |
| JP | 2000102643 | A | 4/2000 |
| JP | 2001353257 | A | 12/2001 |
| JP | 2002165958 | A | 6/2002 |
| JP | 2003154047 | A | 5/2003 |
| JP | 3424032 | B2 | 7/2003 |
| JP | 2003190385 | A | 7/2003 |
| JP | 2005046255 | A | 2/2005 |
| JP | 2005052193 | A | 3/2005 |
| JP | 2005052195 | A | 3/2005 |
| JP | 3811299 | B2 | 8/2006 |
| JP | 2007061465 | A | 3/2007 |
| JP | 2008154672 | A | 7/2008 |
| JP | 2009112413 | A | 5/2009 |
| JP | 4436083 | B2 | 3/2010 |
| JP | 4480126 | B2 | 6/2010 |
| JP | 5137069 | B2 | 2/2013 |

OTHER PUBLICATIONS

Notice of Allowance and Fee(s) Due, dated Sep. 24, 2018, for U.S. Appl. No. 29/616,091, filed Sep. 1, 2017.

Office Action, dated May 23, 2019, for U.S. Appl. No. 15/694,959, filed Sep. 4, 2017.

* cited by examiner

Figure 11
Figure 12
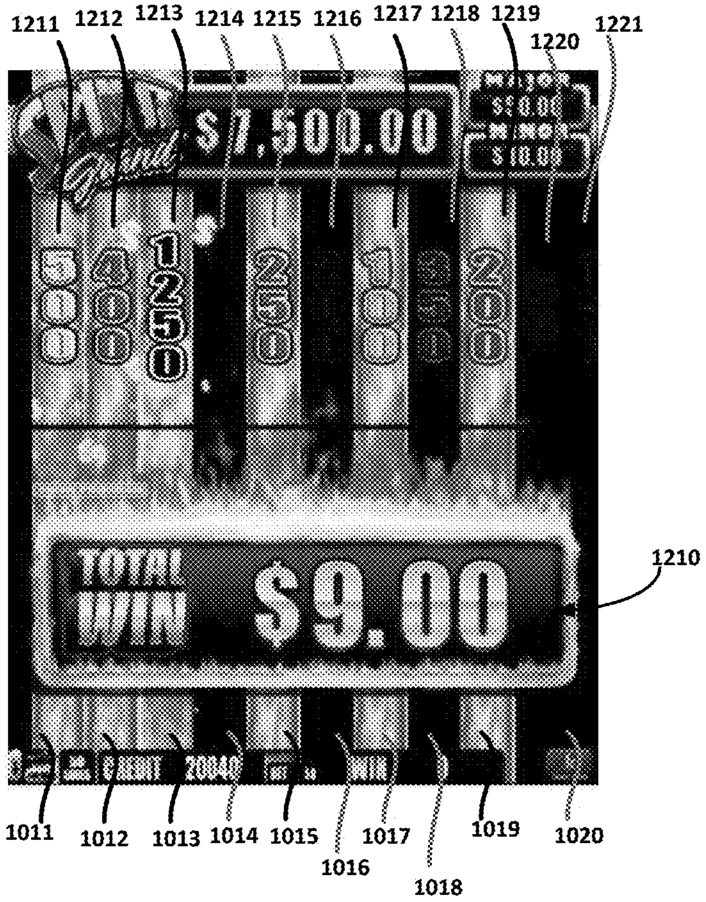

SPINNING REEL GAME WITH A SYNCHRONIZED SPINNING PRIZE REEL

RELATED APPLICATIONS

The present application claims priority to Australian Provisional Patent Application No. 2017901012, filed Mar. 22, 2017, entitled "A GAMING MACHINE AND A METHOD OF OPERATING A GAMING MACHINE," U.S. Design application No. 29/616,091, titled "DISPLAY SCREEN OR PORTION THEREOF WITH TRANSITIONAL GRAPHICAL USER INTERFACE," filed Sep. 1, 2017, and U.S. patent application Ser. No. 15/694,959, titled "A METHOD OF GAMING, A GAMING SYSTEM AND A GAME CONTROLLER," filed Sep. 4, 2017, which are incorporated herein by reference in their entirety.

FIELD

The present invention relates to a gaming machine and a method of operating a gaming machine.

BACKGROUND

In existing spinning reel based gaming machines, the manner in which spinning reels are evaluated is fixed by the choices a player makes when placing a wager. In one example, a player chooses a number of lines to play and an amount of credits to wager per line to define a wager. The player then initiates a play of the gaming machine. The gaming machine spins the spinning reels and when they stop a plurality of columns (e.g. 5) of symbols (e.g. 3) are displayed on the display of the gaming machine. The selected symbols are evaluated using the selected lines and a pay table to determine whether there are one or more winning symbol combinations on an active line. An award is then made based on the amount specified in the pay table for the winning symbol combination(s) and the amount wagered per line.

A need exists for alternative gaming machines.

SUMMARY

In a first aspect, the invention provides a gaming machine comprising:

a first reel having prizes thereon, the first reel configured to be spun in a first direction to a stopped configuration in which a plurality of the prizes are displayed at respective ones of a plurality of first display positions arranged in a line extending in the first direction;

a set of second reels, each second reel comprising a plurality of symbols including at least one index symbol, wherein each second reel is aligned with one of the first display positions, and wherein each reel of the set of second reels is configured to be spun in a second direction transverse to the first direction; and a game controller arranged to:

control each of the set of second reels to spin at least once to a respective stop position to thereby select, at the conclusion of the spinning, a symbol for display for each of the second reels;

determine an index comprising a set of first symbol display positions after finishing spinning the set of second reels, wherein the index is for evaluating the first reel, and wherein the index is determined by identifying which of the first symbol positions are aligned with second reels displaying index symbols;

control the first reel to spin and stop; and determine an award to make by evaluating the prizes displayed after the first reel stops based on the index.

In an embodiment, the game controller is initially configured to conduct a number of spins of the reels, and to hold any reel for which an index symbol is selected in any spin of the reels so that it is not spun in any subsequent spin of the reel.

In an embodiment, the game controller is configured reset the number of spins to an initial value of the number of spins each time at least one index symbol is selected unless index symbols are selected for each of the reels.

In an embodiment, the game controller is configured such that, if index symbols are selected for all of the reels after finishing spinning of the set of second reels, the game controller bypasses the process of generating an index and makes a defined award.

In an embodiment, the game controller evaluates the prizes by summing amounts of the prizes together.

In an embodiment, the game controller evaluates the prizes by determining a largest prize.

In an embodiment, the index indicates which prizes should be included in the evaluation.

In an embodiment, the index indicates which prizes should be excluded from the evaluation.

In an embodiment, the first reel is a mechanical reel.

In an embodiment, the second reels are mechanical reels.

In an embodiment, the second reels are virtual reels.

In an embodiment, the first reel is a virtual reel.

In an embodiment, first and last of the first symbol display positions are treated as contiguous and the reel is the same length as the number of first display positions.

In an embodiment, at least one of the prizes changes in response to a game event.

In an embodiment, the game event is occurrence of a defined combination of symbols in a base game.

In an embodiment, a defined one of the prizes is incremented each time the defined combination of symbols occurs.

In an embodiment, the first reel is spun horizontally and each of the reels of the set of second reels is spun vertically.

In an embodiment, the game controller employs values obtained from a random number generator to determine stopping positions of the first reel and each of the second reels.

In a second aspect, the invention provides a gaming machine comprising:

a first reel having prizes thereon, the first reel configured to be spun in a first direction to a stopped configuration in which a plurality of the prizes are displayed at respective ones of a plurality of first display positions arranged in a line extending in the first direction;

a first set of second reels and a second set of second reels, each second reel comprising a plurality of symbols including at least one index symbol, wherein each second reel is aligned with one of the first display positions, and wherein each reel of the first and second sets of second reels is configured to be spun in a second direction transverse to the first direction; and a game controller arranged to:

control each of the second reels to spin at least once to a respective stop position to thereby select, at the conclusion of the spinning, a symbol for display for each of the second reels;

determine an index for each of the first and second sets of reels after finishing spinning the sets of second reels, each index comprising a set of first symbol display positions, wherein each index is for evaluating the first reel, and wherein each index is determined by identifying which of the first symbol positions are aligned with second reels displaying index symbols;

control the first reel to spin and stop; and determine awards by evaluating the prizes displayed after the first reel stops based on the first and second indices.

In a third aspect, the invention provides a gaming system comprising first and second gaming machines, the first and second gaming machines collectively comprising:

a first reel having prizes thereon, the first reel configured to be spun in a first direction to a stopped configuration in which a plurality of the prizes are displayed at respective ones of a plurality of first display positions arranged in a line extending in the first direction;

a first set of second reels and a second set of second reels, each second reel comprising a plurality of symbols including at least one index symbol, wherein each second reel is aligned with one of the first display positions, and wherein each reel of the first and second sets of second reels is configured to be spun in a second direction transverse to the first direction; and the gaming system arranged to:

control each of the second reels to spin at least once to a respective stop position to thereby select, at the conclusion of the spinning, a symbol for display for each of the second reels;

determine an index for each of the first and second sets of reels after finishing spinning the sets of second reels, each index comprising a set of first symbol display positions, wherein each index is for evaluating the first reel, and wherein each index is determined by identifying which of the first symbol positions are aligned with second reels displaying index symbols;

control the first reel to spin and stop; and determine awards by evaluating the prizes displayed after the first reel stops based on the first and second indices.

In a fourth aspect, the invention provides a method of operating a gaming machine, wherein the gaming machine comprises a first reel having prizes thereon, the first reel configured to be spun in a first direction to a stopped configuration in which a plurality of the prizes are displayed at respective ones of a plurality of first display positions arranged in a line extending in the first direction, and a set of second reels, each reel comprising a plurality of symbols including at least one index symbol, wherein each second reel is aligned with one of the first display positions, and wherein each reel of the set of second reels is configured to be spun in a second direction transverse to the first direction, the method comprising controlling each reel of the set of second reels to spin at least once to a respective stop position to thereby select, at the conclusion of the spinning, a symbol for display for each of the second reels;

determining an index comprising a set of first symbol display positions after finishing spinning the set of second reels, wherein the index is for evaluating the first reel, and wherein the index is determined by identifying which of the first symbol positions are aligned with second reels displaying index symbols;

controlling the first reel to spin and stop; and determining an award to make by evaluating the prizes displayed after the first reel stops based on the index.

In a fifth aspect, the invention provides a method of operating at least one gaming machine, wherein the at least one gaming machine comprises:

a first reel having prizes thereon, the first reel configured to be spun in a first direction to a stopped configuration in which a plurality of the prizes are displayed at respective ones of a plurality of first display positions arranged in a line extending in the first direction; and a first set of second reels and a second set of second reels, each second reel comprising a plurality of symbols including at least one index symbol, wherein each second reel is aligned with one of the first display positions, and wherein each reel of the first and second sets of second reels is configured to be spun in a second direction transverse to the first direction, wherein the method comprises:

controlling each of the second reels to spin at least once to a respective stop position to thereby select, at the conclusion of the spinning, a symbol for display for each of the second reels;

determining an index for each of the first and second sets of reels after finishing spinning the sets of second reels, each index comprising a set of first symbol display positions, wherein each index is for evaluating the first reel, and wherein each index is determined by identifying which of the first symbol positions are aligned with second reels displaying index symbols;

controlling the first reel to spin and stop; and determining awards by evaluating the prizes displayed after the first reel stops based on the first and second indices.

In a sixth aspect, the invention provides computer program code which when executed implements the above method.

In a seventh aspect, the invention provides a tangible computer readable medium comprising the above program code.

BRIEF DESCRIPTION OF DRAWINGS

An exemplary embodiment of the invention will now be described with reference to the accompanying drawings in which:

FIGS. 10 and 11 illustrate generation of an index;

FIG. 12 illustrates an evaluation of a first set of reels using the index;

DETAILED DESCRIPTION

Figure 1:
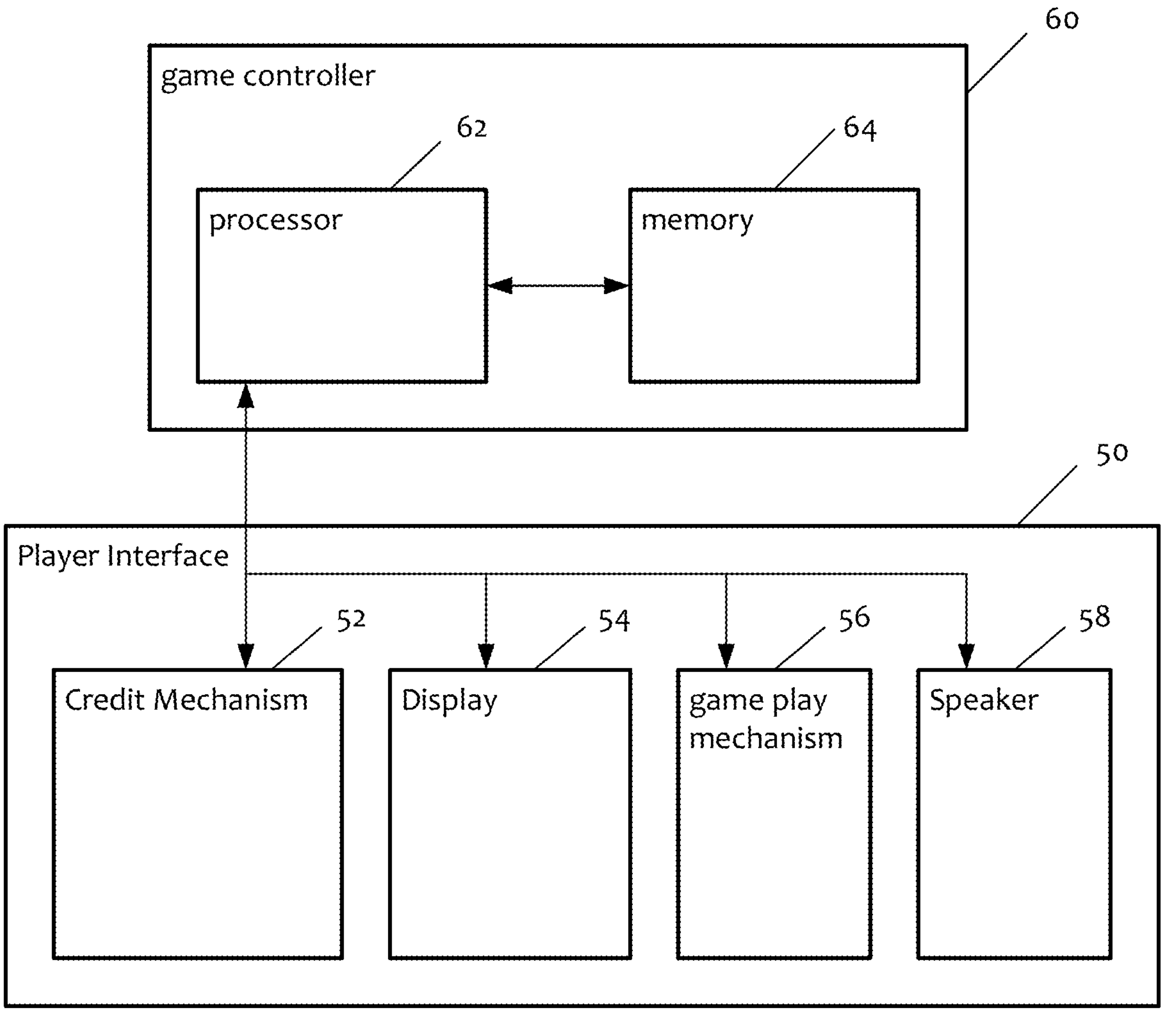
FIG. 1 is a block diagram of the core components of a gaming system.

Referring to the drawings, there is shown a gaming machine having a first reel that spins in a first direction (e.g. horizontally) and carries prizes and a set of second reels that spin in a second direction transverse to the first direction (e.g. vertically). Each of the second reels is aligned with a position at which one of the prizes of the first reel is displayed after the first reel stops spinning. Each of the reels of the set of second reels has a plurality of symbols including an index symbol. The reels of the set of second reels are spun at least once. When, after spinning of the second reels has finished, there are index symbols displayed on the second reels, these are used to define an index for evaluating the first reel. In an embodiment, each of the prizes indexed by an index symbol is awarded to the player.

General Construction of Gaming System

The gaming system can take a number of different forms. In a first form, a standalone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
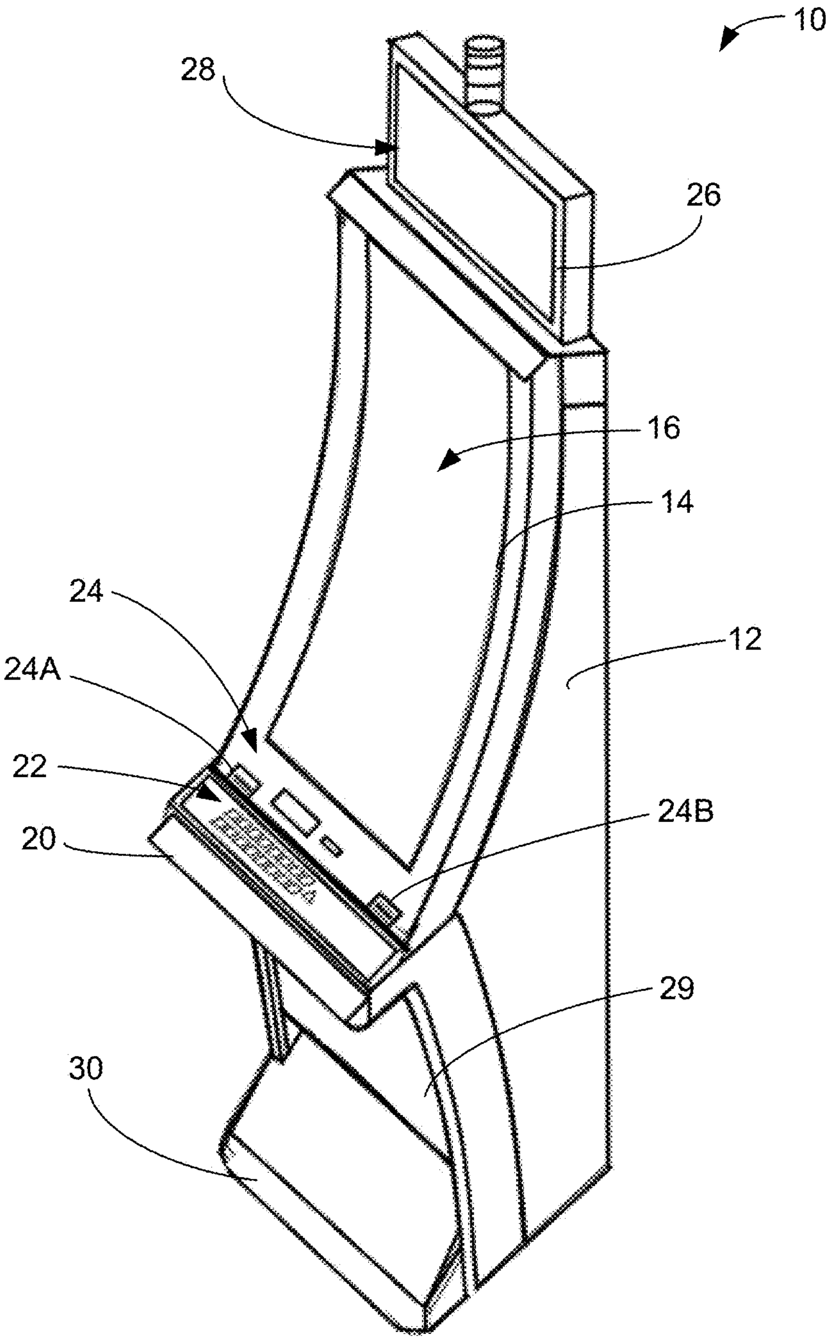
FIG. 2 is a perspective view of a stand alone gaming machine.

A gaming system in the form of a standalone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module that is accessed in response to insertion of the player tracking device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a liquid crystal display. The display 14 may any other suitable video display unit, such as an OLED display. In some embodiments, the display can be the visible portion of a set of electromechanical reels. The top box 26 may also include a display, which may be of the same type as the display 14, or of a different type.

Figure 3:
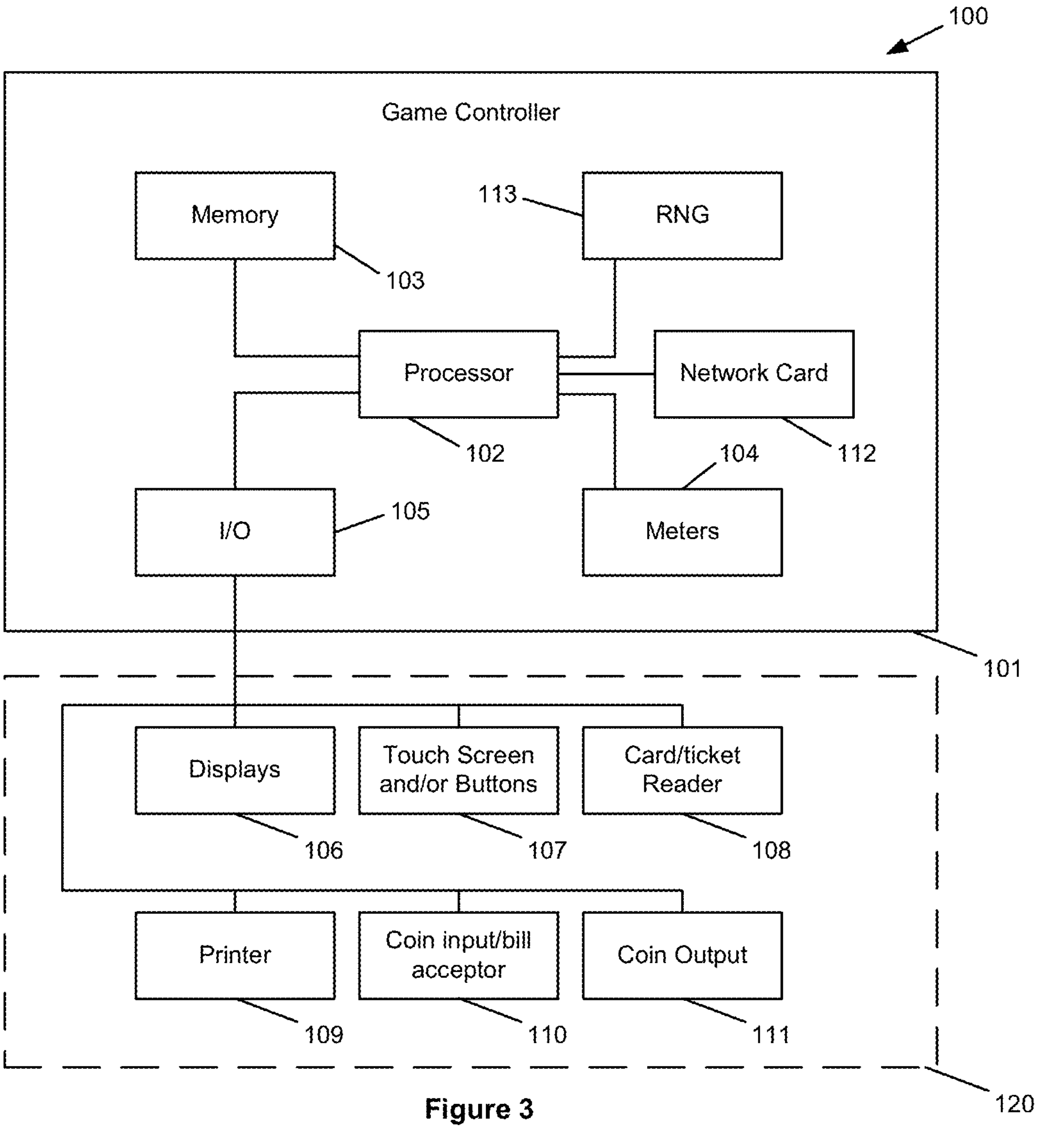
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
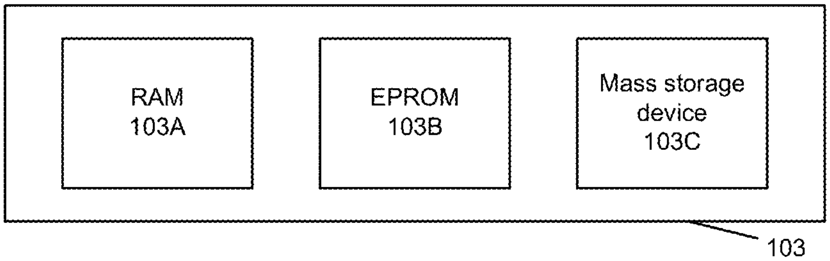
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
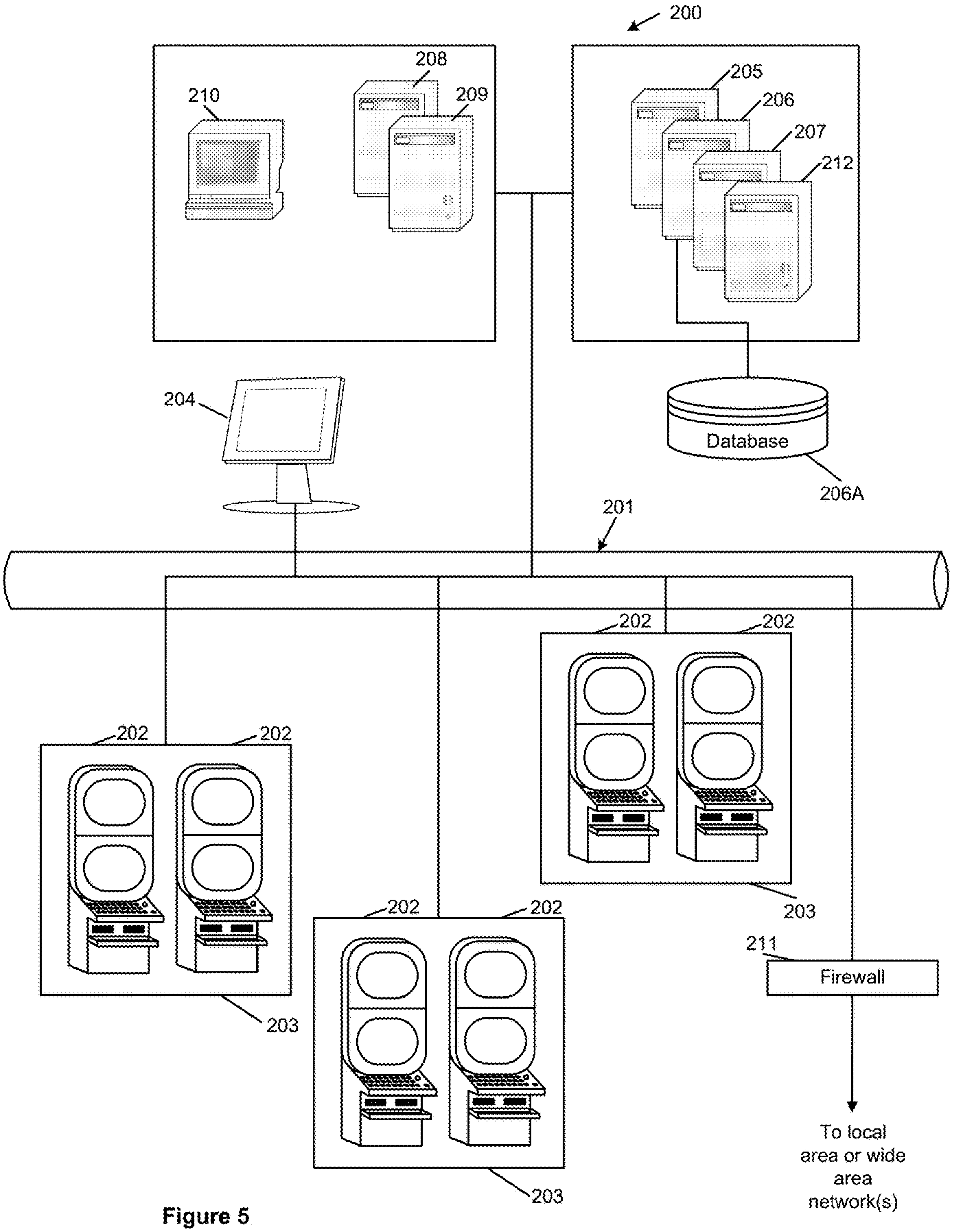
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming Machine

In an embodiment the gaming machine has a first reel that spins horizontally which carries prizes and a set of second reels that spin in a vertical direction. In the embodiment, the first and second reels are employed during a feature game while a third set of reels is employed during a base game. A trigger condition can occur during the base game which results in the play of the feature game using the first reel and the set of second reels. In other embodiments, the gaming machine may only incorporate the first reels and the second reels. That is, the generation and use of an index to evaluate a game outcome as described in further detail below can be the sole method of evaluating a game outcome using the gaming machine.

Before starting a play of the base game, the player operates the game play mechanism 56 to specify a wager which will be evaluated for this play of the game and initiates a play of the game. Persons skilled in the art will appreciate that a player's wager can be varied from game to game dependent on player selections. In most spinning reel games, it is typical for the player's wager to be made up of a selection as to how the game outcome will be evaluated by specifying what parts of the game outcome will qualify for winning outcomes and a multiplier that will apply to each winning outcome. For example, a player's wager may be based on how many lines they play in each game—e.g. a minimum of one line up to the maximum number of lines allowed by the game (noting that not all permutations of win lines may be available for selection) and an amount per line—e.g. one, two or five credits. Winning outcomes on an activated win line may be evaluated based on a pay table that specifies the amount awarded for a one credit per line wager multiplied by the amount wagered per line.

Such win lines are typically formed by a combination of symbol display positions, one from each reel, the symbol display positions being located relative to one another such that they form a line.

In many games, the gaming machine may award winning outcomes which are not strictly limited to the lines they have selected, for example, "scatter" pays are awarded independently of a player's selection of pay lines.

Persons skilled in the art, will appreciate that in other embodiments, the player may select a number of reels to play or play a fixed number of reels. Games of this type are marketed under the trade name "Reel Power" by Aristocrat Leisure Industries Pty Ltd and are also known as "ways" to win games. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reels, the active display positions being all display positions of each selected reel and the designated display position of the non-selected reels. As a result for five reels and fifteen display positions there are 243 ways to win.

Figure 6:
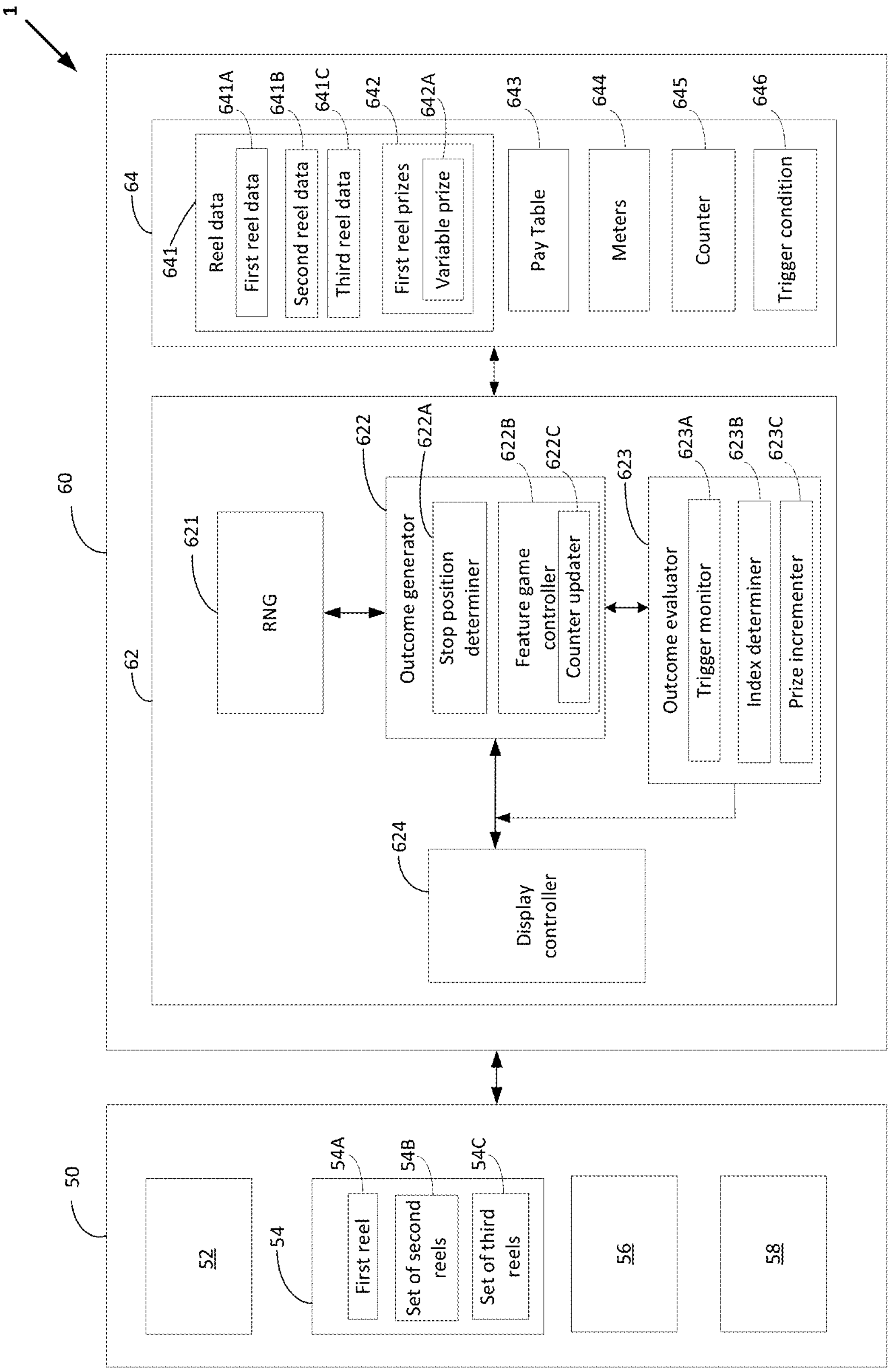
FIG. 6 is a further block diagram of a gaming system.

In FIG. 6, the processor 62 of game controller 60 is shown implementing a number of modules based on program code and data stored in memory 64. Persons skilled in the art will appreciate that various of the modules could be implemented in some other way, for example by a dedicated circuit. Further, depending on the implementation, one of more of the sets of reels could be implemented using electromechanical reels.

After the player has initiated a play of the base game by, for example pressing an initiate play button that forms part of the game play mechanism 56, the outcome generator 622 operates to generate an outcome of the base game. In the embodiment, all of the reels employed in the base game are virtual reels that are specified in memory 64 as third reel data 641C. Each reel defines a sequence of stopping positions and the symbol (or in the case of the first reel described in further detail below prize value) that corresponds to specific stopping positions. The last position on the reel is treated as contiguous with the first position so that the reels can spin in a continuous loop.

During the base game, the outcome generator uses the third reel data 641C which specifies the symbols that will appear on each of the reels during the base game. The outcome generator 622 has a stop position determiner 622A which will determine a stopping position for each of the reels. In the example described below, there are five reels and three symbols are displayed for each of those five reels once the reels are stopped. In an example, the stop position corresponds to the middle symbol position of the three symbols. When the stop position determiner 622A determines a particular stopping position of the reel, the symbol at that stopping position will be displayed at a middle symbol position with the symbols before and after it displayed at the top and bottom positions respectively. When symbols are selected, they are displayed on the display as the third set of reels 54C under control of display controller 624. The outcome evaluator 623 determines from the selected symbols and the player's win entitlement, whether to make any awards for winning combinations specified in pay table 643. The outcome evaluator also includes a trigger monitor 623A which determines whether a trigger condition 646 such as a defined combination of symbols is met by the selected symbol. When a trigger condition is met, the feature game is initiated by the feature game controller 622B as will be described in further detail below.

The outcome evaluator 623 also has a prizing incrementer 623C. In embodiments of the invention, the first reel data 641A includes a plurality first reel prizes 642 which corresponded to different stopping positions on the first reel as will be described further below. At least one of the prizes is variable prize 642A which can be updated during play of the base game.

The prize incrementer 623C determines whether a condition for incrementing the variable prize 642A, such as a particular combination of symbols, is met by the selected set of symbols and updates the variable prize 642A to reflect any change in the prize. In an embodiment the first reel is displayed during conduct of the base game including the position of the variable prize 642A so that increments to the variable prize can be viewed during play of the base game. In some embodiments, all possible prizes that can be awarded on the first reel are concurrently displayed on display 54.

Once the feature game is triggered, the feature game controller 622A component of the outcome generator 622 is initiated to control the feature game. The feature game controller 622B initiates a counter 645, for example at an initial value of three spins of the second reels.

The display controller 624 modifies the display to show the set of second reels 54B on display 54. As will be described in further detail below, the second reels are shown as being aligned with positions at which prizes from the first reel are displayed when the first reel stops spinning. In one embodiment, a set of ten second reels are employed and these are aligned with ten positions at which prizes from the first reel can be displayed as will be described in further detail below.

In an embodiment, a single symbol is displayed on each of the second reels at any one time. In other embodiments, more symbols may be displayed.

The feature game controller uses the random stop position determiner 622A to obtain a value from the random number generator 621 to determine a stopping position for each of the second reels. The second reel data 641B incorporates a mixture of index symbols and other symbols for each reel. The stop position determiner 622A randomly determines stopping positions for each of the second reels. The reels are displayed as spinning on display 54 to their stop positions. When the reels reach their stop positions, it is determined by counter updater 622C of the feature game controller 622B whether any new index symbols are displayed. If at least one new index symbol is displayed the counter updater 622C resets the counter to the initial value (in this case three). If no new index symbols are displayed the counter updater 622C reduces the counter 645 by one. That is, the counter value 645 is kept in memory 64 and counter updater 622C of the feature game controller either decrements the counter 645 or resets it depending on whether or not the stop position determiner 622A selects a stopping position corresponding to one of the index symbols.

In other embodiments, the number of spins is increased by one each time an index symbol is selected so that there is an extra spin.

In embodiments of the invention, if an index symbol is selected for one of the reels, this reel is held with the index symbol displayed and not spun again in subsequent game rounds. Accordingly, as index symbols are selected, a reduced number of reels are spun by the feature game controller.

When the counter reaches zero, the index determiner 623B determines the index that will be applied to a valuation of the first reel based on which of the second reels displays an index symbol. The first reel is then spun on the display 54 to a stopping position determined by stop position determiner 622A using random number generator 621. When the first reel is stopped, prizes from the first reel are displayed at positions aligned with the second reels.

The outcome evaluator 623 evaluates the first reel 54A using the index determined from the second set of reels 54B. In an embodiment, the outcome evaluator 623 awards the sum of the prizes shown at the indexed positions on the first reel 54A. In another embodiment, the outcome evaluator awards the highest of the prizes shown at the indexed positions.

In some embodiments, a special prize, for example a jackpot or a progressive jackpot award is made if all of the second reels have an index symbol. This prize may be made instead of, or in addition to, the prizes determined by applying the index generated from the set of second reels to the first reels.

In an embodiment prizes are added initially to the win meter of meters 644 and then will be transferred to the credit meter at the start of a new game or if the player cashes out. In some embodiments, prizes over a certain value are transferred directly to the credit meter of meters 644.

Figure 7:
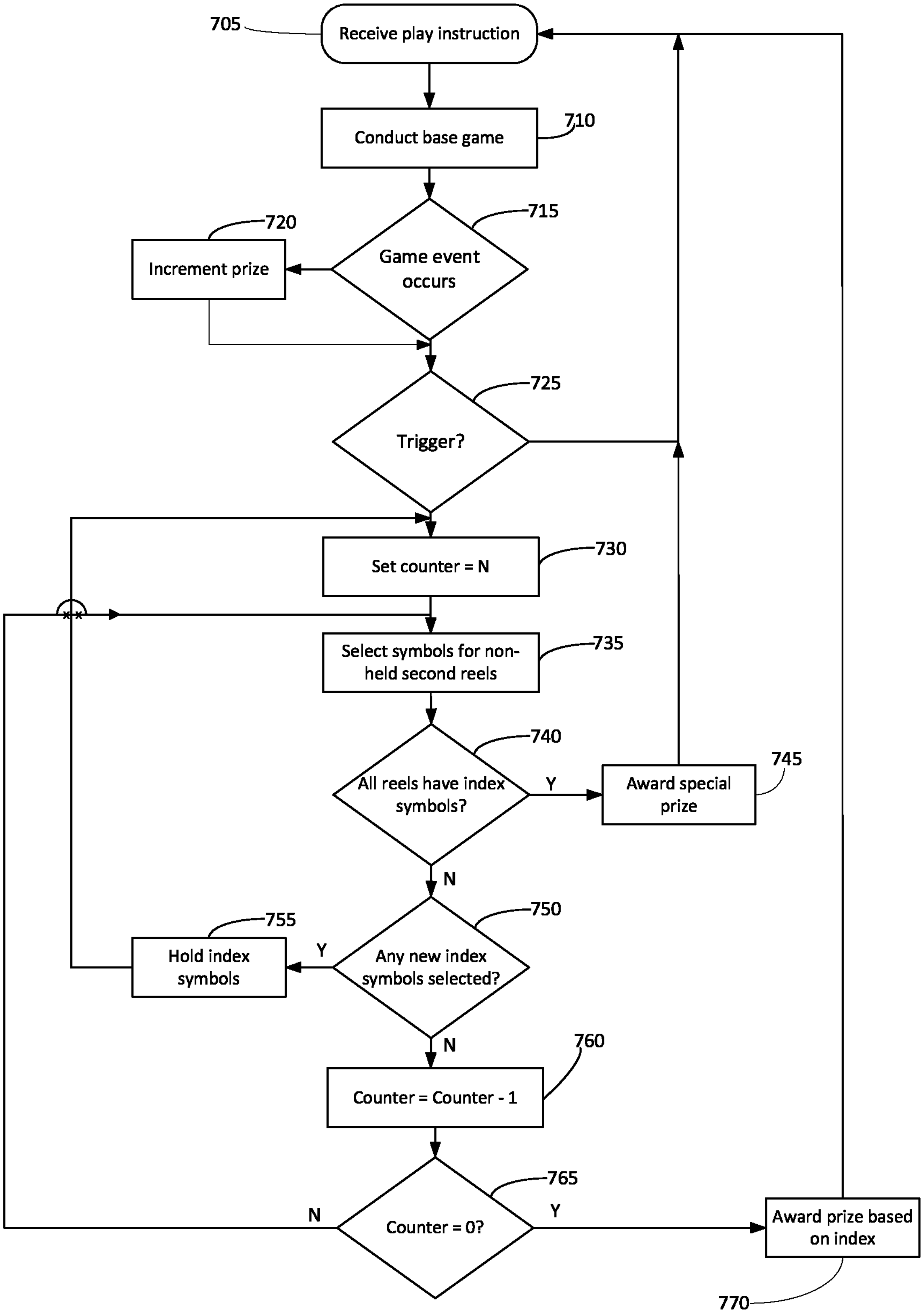
FIG. 7 is a flow chart of an embodiment.

The method of the embodiment is summarized in FIG. 7. The method 700 involves receiving 705 a play instruction and conducting 710*a* base game. At step 715 the method involves determining whether a game event, such as the combination of particular set of symbols occurs during the base game. If the game event occurs, the game controller of gaming machine increments 720 the variable prize. At step 725, the method involves determining whether a trigger condition is met in respect to the base game. If it is not met, the gaming machine reverts to waiting to receive 705 a game play instruction.

When the trigger condition is met, at step 730 the game controller sets a counter to an initial value (e.g. three) of spins of the second sets of reels.

At step 735, the method involves selecting symbols from the respective second reels for each second reel which does not already have a held index symbols. In a first spin of the reels, this will involve spinning all of the reels but in later spins of the reels fewer than all of the reels may be spun depending on how many index symbols have been selected.

In an example of the embodiment, if at the conclusion of any spin of the reel, all reels have index symbols then a special prize is awarded 745 such as a jackpot prize, and the game reverts to waiting to receive a game play instruction 705.

Assuming not all the reels have index symbols, the method involves determining 750 whether any new index symbols have been selected in this spin of some or all of the second reels. If this has occurred, the method involves holding 755 the index symbols and resetting 730 the counter to the initial value before repeating the process of selecting second symbols for each non held second reel. If at step 750 no new index symbol is selected, the method proceeds to step 760 where the counter's current value is decremented by one 760. At step 765 it is determined whether the counter has reached the value zero. If it hasn't the method proceeds to selecting a further set of symbols by repeating step 735.

Once the counter reaches zero, the method proceeds to step 770 where the index is determined and first reel is evaluated using the determined index so that an award can be made.

EXAMPLES

Example 1

Figure 8:
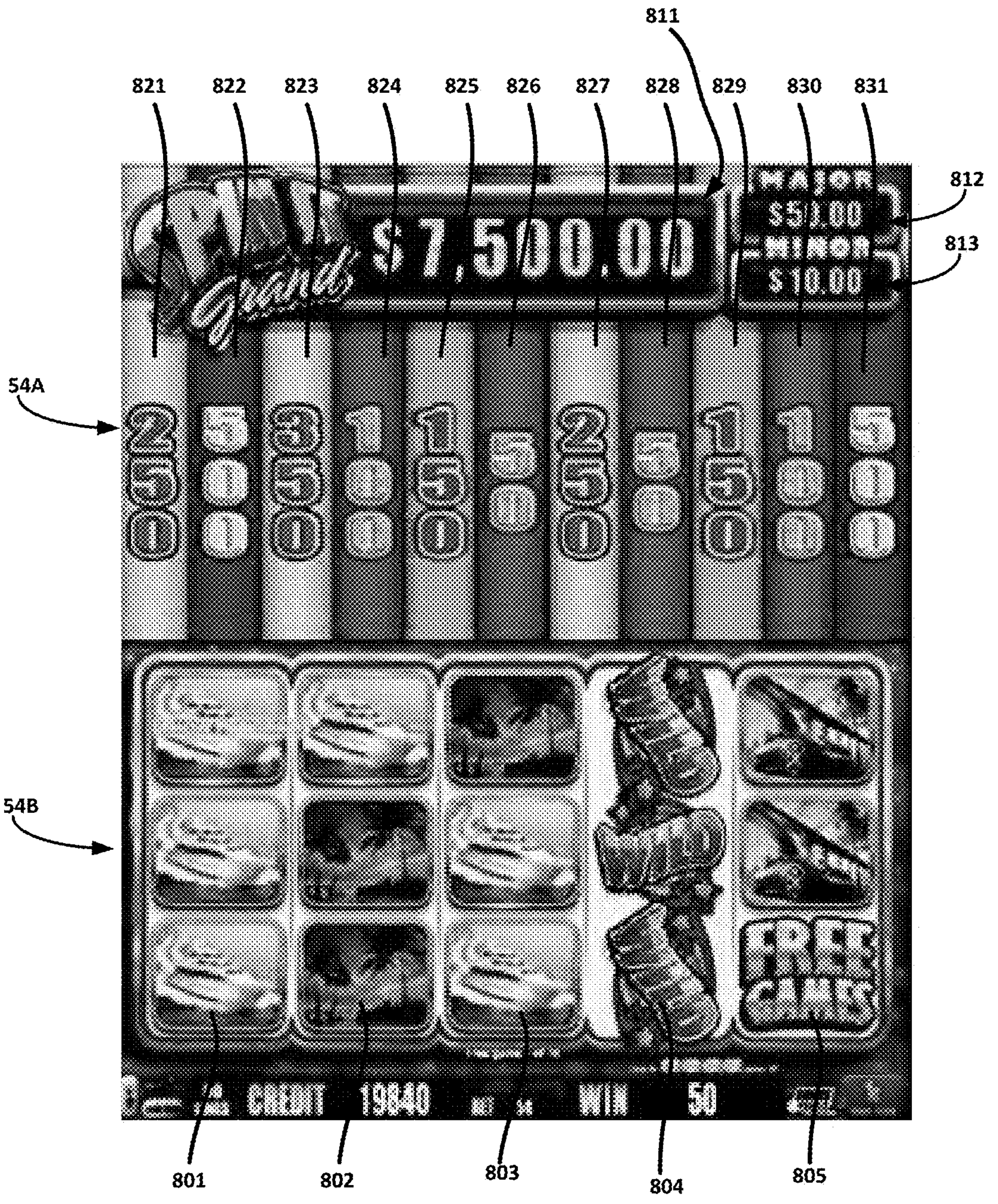
FIG. 8 illustrates a reel layout during a base game.

Referring to FIG. 8, there is shown an example of a how the game is displayed to a player. In this example, first reels 54A are displayed on a first electronic display of the gaming machine and the third reels 54C are displayed on a second electronic display of the gaming machine. As shown in FIG. 8, during conduct of the base game, initially eleven prize values 821 to 831 are displayed for the first reel. For the third set of reels 54C used for conducting the base game there are three symbols displayed in each of five columns 801 to 805 corresponding to five reels. The first display also displays a current value of a progressive jackpot 811, and amounts that can be won for a major jackpot 811 and a minor jackpot 813. In this respect, the major and minor jackpot prizes may be prizes that appear directly on the first reel 54. It will be apparent that the first reel contains one prize value at each position. The first reel will spin horizontally when it is spun during play of the feature game.

Figure 9:
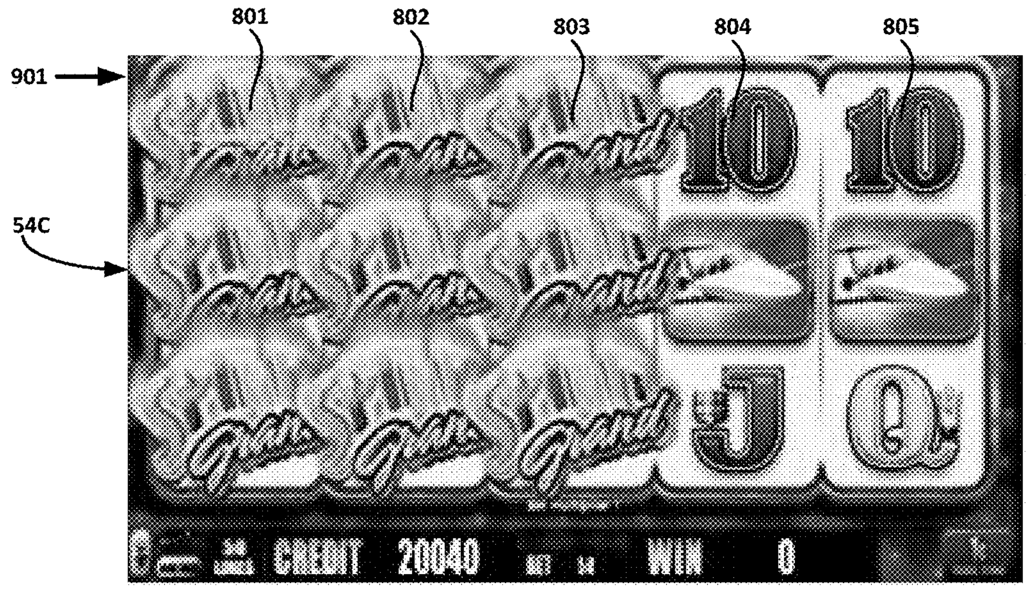
FIG. 9 illustrate a trigger condition being met in a base game.

FIG. 9 illustrates an example display of the third reels where a trigger condition has occurred. In the example, the trigger condition is six or more "spin it grand" symbols 901 appearing in any of the columns 801 to 805. In this example, nine "spin it grand symbols" are displayed.

Figure 10:

FIG. 10 illustrated the process of generation of an index using the second set of reels. There are ten second reels 1011 to 1020. The counter 1032 shows that the player has two spins left at the current stage of generating the index.

Further counter 1031 indicates how many of the index symbol 1041 are required to win the progressive jackpot 811.

FIG. 11 shows a completed index where six index symbols 1041 are displayed respectively on the first reel, second reel 1012, third reel 1013, fifth reel 1015, seventh reel 1017 and ninth reel 1019 of the set of second reels. At this point, the first reel is spun by the game controller 60.

FIG. 12 shows how each of the reels of the second set of reels 1011 to 1020 is aligned with a display position 1211 to 1220 at which a prize is displayed on the first reel. That is, first reel 1011 is aligned with first position 1211, second reel 1012 is aligned with second position 1212, etc. In this example, the eleventh position on the first reel 1221 is not aligned with any second reels. Accordingly, in the illustrated example, symbol positions of the first reel are indexed by the index symbols shown on second reels 1011, 1012, 1013, 1015, 1017 and 1018. This is highlighted by the flame background to each of these symbol positions on the first reel and the alignment of them to the index positions on the set of second reels.

In this example, six of the prizes are awarded corresponding to that at symbol position 1211, 1212, 1213, 1215, 1217 and 1218. The total amount won is indicated to the player in a prize display 1210 on top of the set of second reels. Note that the prize amount illustrated in this figure is for illustrative process and does not add up to the sum of the prizes shown in the top window.

Figure 13:
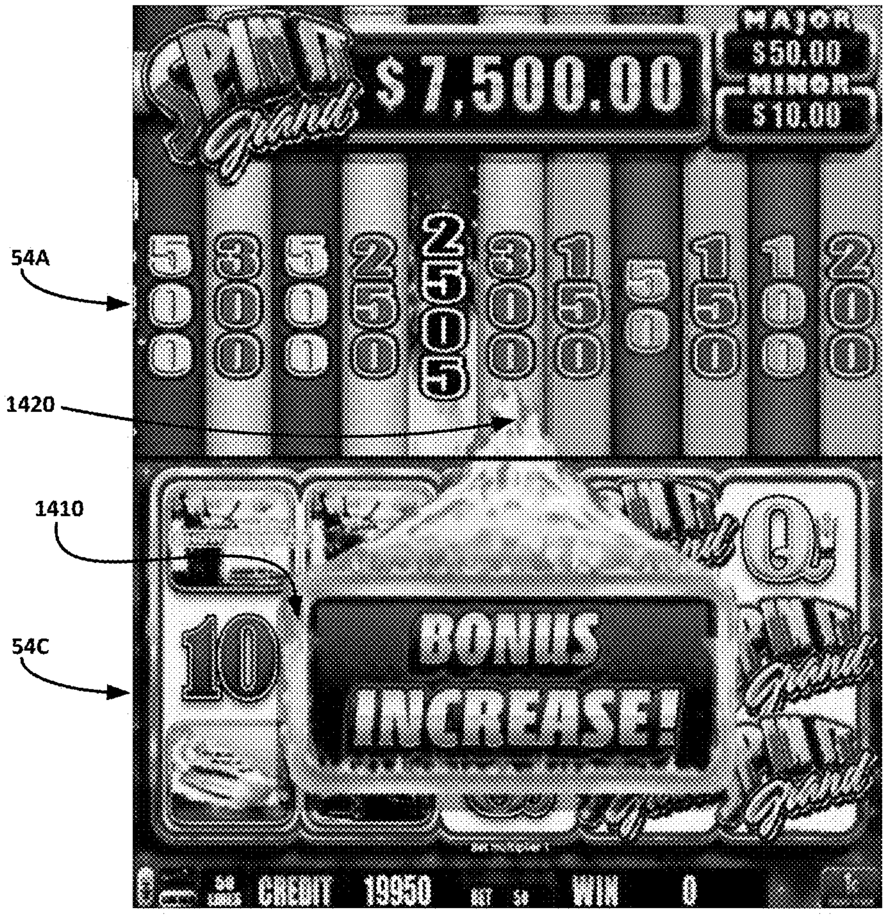
FIG. 13 illustrates how a prize of the feature game can be increased during the base game.

Referring to FIG. 13, there is shown the mechanism by which a prize is incremented during the base game. In an example, when four or five "spin it grand symbols" land on the reels in the base game, they apply a bonus increment to the first reel. In this example, prize 1420 has been incremented. A bonus increase message 1410 is displayed in order to communicate the increase in the prize amount.

Example 2

Figure 14:
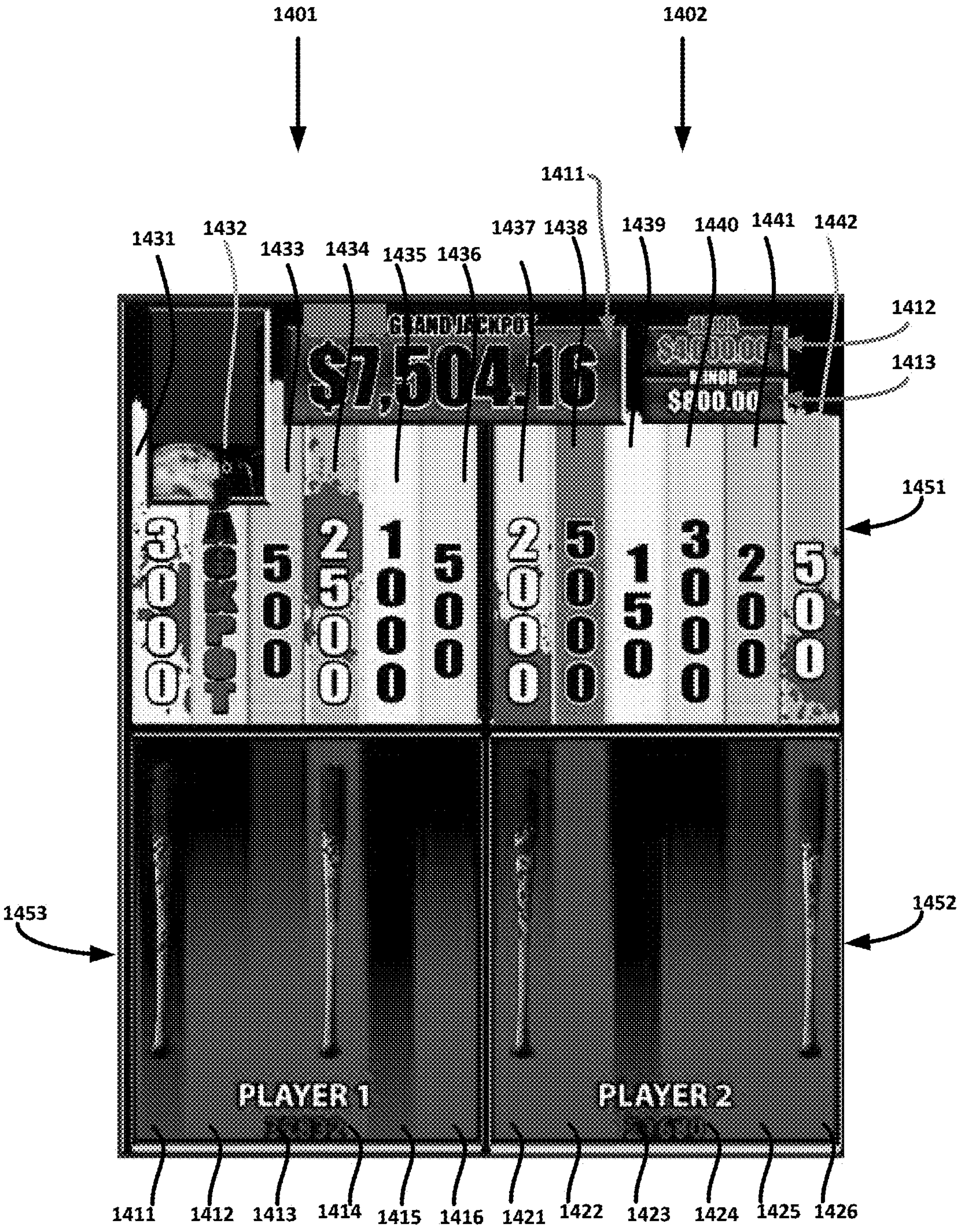
FIG. 14 illustrates a two-player example where the first reel spans two games and two separate indices are generated.

FIG. 14 illustrates an example where the indexing technique for awarding a prize is used in a two player game. As in the previous example, the display includes a display of a progressive jackpot 1411, a major jackpot 1412 and a minor jackpot 1413.

In the example, the technique is employed using two connected gaming machines 1401, 1402 each having two displays. In the example, each of the first and second gaming machines 1401, 1402 has a bottom display which is used to display a set of second reels 1452,1453 while the top displays of each gaming machine displays a common first reel 1451 having twelve prize display positions 1431 to 1442.

The first gaming machine 1401 has a set of six second reels 1411, 1412, 1413, 1414, 1415, 1416. The second gaming machine also has a set of six second reels 1421, 1422, 1423, 1424, 1425, 1426.

FIG. 14 illustrates an example, where indexes have been generated for both gaming machines. The index generated for first gaming machine 1401 is indicated by the index symbol in the form of a baseball bat being displayed on reels 1411 and 1414. This first index corresponds to first reel positions 1431 and 1434. The index generated for second gaming machine 1402 is indicated by the index symbol being displayed on reels 1421 and 1426. This second index corresponds to first reel positions 1437 and 1442.

In one example, separate awards are made on the first gaming machine and the second gaming machine based on the indexed first reel positions. In another example, the higher of the two awards is made. In this case, the award on the first gaming machine 1401 is 5500 credits based on the first index whereas the award on the second gaming machine 1402 is 2500 credits based on the second index such that if only the higher award is made, it will be made on the first gaming machine 1401.

It will be appreciated that the above two player example could be extended to more than two players.

Persons skilled in the art will appreciate that a feature game involves some additional element of game play which usually only occurs when a trigger condition is met. In spinning reel prize feature game described above, the game could incorporate an additional feature game. Types of feature games include: those where a series of free game events are awarded such as free games or re-spins (where some reels are held while others are re-spun); games where the symbols on the reel are changed; and "second screen" games where game play is totally different to the base game, for example where the player makes selections in a "pick a box type" game.

It will be appreciated that in some embodiments, one or more of the virtual reels described above may instead be implemented by a mechanical reel. For example, the reels in FIG. 12 could be mechanical. Some adjustments may need to be made to adapt the invention to mechanical reels, for example by reducing the number of reels for determining the index.

Typically, a winning outcome will result in some form of award being made such as an award of credits. Such an award may never actually be physically received by a player. For example, many gaming systems provide a player with a double or nothing gamble feature, where the player can double or forfeit their credits before commencing another play of the game or cashing out. Further, as credits are fungible, once credits have been added to the credit meter it is not possible to distinguish between credits which exist because the player has input cash or the like and credits resulting from an award.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art, will appreciate that program code provides a series of instructions executable by the processor.

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A gaming machine comprising:

at least one display device displaying:

a first reel, the first reel comprising a plurality of first display positions, each of the plurality of first display positions displaying at least one of a plurality of prizes and operable to be spun in a first direction in which at least one of the plurality of prizes is aligned with the plurality of first display positions arranged in a line extending in the first direction;

a set of second reels, each reel of the set of second reels comprising a plurality of symbols, and operable to be spun in a second direction transverse to the first direction; and a game controller comprising a processor and memory, the memory storing instructions, which, when executed, cause the game controller to at least:

control each reel of the set of second reels to spin in the second direction and stop to a respective stopping position, determine, once each reel of the set of second reels reaches the respective stopping position, whether at least one trigger symbol is displayed by at least one of the set of second reels, modify, in response to the at least one trigger symbol being displayed on the at least one of the set of second reels, the set of second reels to display a set of third reels, control each reel of the set of third reels to spin in the second direction and stop to display one of an index symbol and a different symbol, control the first reel to spin in the first direction and stop to a first reel stopping position that aligns each of the plurality of first display positions with each reel of the set of third reels, evaluate the first reel to determine whether to award at least one of the plurality of prizes by identifying each of the plurality of first display positions that is aligned with a corresponding reel of the set of third reels displaying the index symbol after the first reel reaches the first reel stopping position and each of the set of third reels stops spinning; and display the at least one of the plurality of prizes determined to be awarded.

2. The gaming machine as claimed in claim 1, wherein executing the instructions further causes the game controller to initially conduct a number of spins of the set of second reels, and to hold any reel of the set of second reels for which the at least one trigger symbol is selected in any spin of the reel of the set of second reels so that it is not spun in any subsequent spin of the set of second reels.

3. The gaming machine as claimed in claim 2, wherein executing the instructions further causes the game controller to reset the number of spins to an initial value of the number of spins each time the at least one trigger symbol is selected unless the at least one trigger symbol is selected for each of the set of second reels.

4. The gaming machine as claimed in claim 1, wherein executing the instructions further causes the game controller to, if the at least one trigger symbol is selected for all reels of the set of second reels after each of the set of second reels reaches the respective stop position, display a predefined prize.

5. The gaming machine as claimed in claim 1, wherein executing the instructions further causes the game controller to evaluate the prizes by summing amounts of the prizes together.

6. The gaming machine as claimed in claim 1, wherein executing the instructions further causes the game controller to evaluate the prizes by determining a largest prize.

7. The gaming machine as claimed in claim 1, wherein each of the plurality of first display positions that is aligned with the corresponding reel of the set of third reels indicates which prizes are included.

8. The gaming machine as claimed in claim 1, wherein each of the plurality of first display positions that are aligned with the corresponding reel of the set of third reels indicates which prizes are excluded.

9. The gaming machine as claimed in claim 1, wherein the first reel is a mechanical reel.

10. The gaming machine as claimed in claim 1, wherein the set of second reels are mechanical reels.

11. The gaming machine as claimed in claim 1, wherein the set of second reels are virtual reels.

12. The gaming machine as claimed in claim 1, wherein the first reel is a virtual reel.

13. The gaming machine as claimed in claim 12, wherein a first and a last of the plurality of first display positions are treated as contiguous and the first reel has a length that equals to a quantity of the plurality of first display positions.

14. The gaming machine as claimed in claim 1, wherein executing the instructions further causes the game controller to change at least one of the plurality of prizes in response to a game event.

15. The gaming machine as claimed in claim 14, wherein the game event is an occurrence of a defined combination of symbols selected for display in the set of second reels.

16. The gaming machine as claimed in claim 15, wherein a defined one of the prizes is incremented each time the defined combination of symbols occurs.

17. The gaming machine as claimed in claim 1, wherein the first reel is spun horizontally and each of the set of second reels is spun vertically.

18. The gaming machine as claimed in claim 1, wherein executing the instructions further causes the game controller to employ values obtained from a random number generator to determine stopping positions of the first reel and each of the set of second reels.

19. A gaming machine comprising:

a first reel, the first reel comprising a plurality of first display positions, each of the plurality of first display positions displaying at least one of a plurality of prizes and operable to be spun in a first direction in which at least one of the plurality of the prizes are displayed at respective ones of the plurality of first display positions arranged in a line extending in the first direction;

a first set of second reels and a second set of second reels, each reel of the first set of second reels and the second set of second reels comprising a plurality of symbols, and operable to be spun in a second direction transverse to the first direction; and a game controller comprising a processor and memory, the memory storing instructions, which, when executed, cause the game controller to at least:

control each reel of the first set of second reels and the second set of second reels to spin in the second direction and stop to a respective stopping position;

determine, once each reel of the first set of second reels and the second set of second reels reaches the respective stopping position, whether at least one trigger symbol of the plurality of symbols is displayed by at least one of the first set of second reels and the second set of second reels;

modify, in response to the at least one trigger symbol being displayed on the at least one of the first set of second reels and the second set of second reels, the first set of second reels and the second set of second reels to display a set of third reels and a set of fourth reels, respectively;

control each reel of the set of third reels and the set of fourth reels to spin in the second direction and stop to display one of an index symbol and a different symbol;

after the set of third reels and the set of fourth reels stop spinning identify each of the plurality of first display positions that aligns with a corresponding reel of the set of third reels and the set of fourth reels displaying the index symbol;

control the first reel to spin in the first direction and stop at a first reel stopping position;

determine whether to award at least one of the plurality of prizes by applying the index symbol that is aligned with the at least one of the plurality of prizes on the first reel after the first reel reaches the first reel stopping position; and display the at least one of the plurality of prizes determined to be awarded.

20. A method of operating a gaming machine, wherein the gaming machine comprises a first reel, the first reel comprising a plurality of first display positions, each of the plurality of first display positions displaying at least one of a plurality of prizes and operable to be spun in a first direction in which at least one of the plurality of the prizes is aligned with the plurality of first display positions arranged in a line extending in the first direction, a set of second reels, each reel of the set of second reels comprising a plurality of symbols, and operable to be spun in a second direction transverse to the first direction, and a game controller comprising a processor and memory, the memory storing instructions, which, when executed, cause the game controller to spin each reel of the set of second reels to spin in the second direction and stop to a respective stopping position, the method comprising:

determining, by the game controller, once each reel of the set of second reels reaches the respective stopping position, whether at least one trigger symbol is displayed by at least one of the set of second reels;

modifying, by the game controller, in response to the at least one trigger symbol being displayed on the at least one of the set of second reels, the set of second reels to display a set of third reels, controlling, by the game controller, each reel of the set of third reels to spin in the second direction and stop to display one of an index symbol and a different symbol;

controlling, by the game controller, the first reel to spin in the first direction and stop to a first reel stopping position that aligns each of the plurality of first display positions with each reel of the set of third reels;

evaluating, by the game controller, the first reel to determine whether to award at least one of the plurality of prizes by identifying each of the plurality of first display positions that is aligned with a corresponding reel of the set of third reels displaying the index symbol after the first reel reaches the first reel stopping position and each of the set of third reels stops spinning; and displaying the at least one of the plurality of prizes determined to be awarded.

21. A method of operating at least one gaming machine, the method comprising:

displaying a first reel on a display, the first reel comprising a plurality of first display positions, each of the plurality of first display positions displaying at least one of a plurality of prizes and operable to be spun in a first direction in which the plurality of the prizes are displayed at respective ones of the plurality of first display positions arranged in a line extending in the first direction;

displaying a first set of second reels and a second set of second reels on the display, each reel of the first set of second reels and the second set of second reels comprising a plurality of symbols including at least one trigger symbol, and operable to be spun in a second direction transverse to the first direction, and initiating a game controller, the game controller comprising a processor and memory, the memory storing instructions, which, when executed, cause the game controller to spin each reel of the first set of second reels and the second set of second reels in the second direction and stop to a respective stopping position;

controlling, by the game controller, each of the first set of second reels and the second set of second reels to spin at least once to the respective stopping position;

determining, by the game controller, once each reel of the first set of second reels and the second set of second reels reaches the respective stopping position, whether at least one trigger symbol of the plurality of symbols is displayed by at least one of the first set of second reels and the second set of second reels;

modifying, by the game controller, in response to the at least one trigger symbol being displayed on the at least one of the first set of second reels and the second set of second reels, the first set of second reels and the second set of second reels to display a set of third reels and a set of fourth reels, respectively;

controlling, by the game controller, each reel of the set of third reels and the set of fourth reels to spin in the second direction and stop to display one of an index symbol and a different symbol;

after the set of third reels and the set of fourth reels stop spinning, identifying each of the plurality of first display positions that aligns with a corresponding reel of the set of third reels and the set of fourth reels displaying the index symbol;

controlling, by the game controller, the first reel to spin in the first direction and stop at a first reel stopping position;

determining, by the game controller, whether to award at least one of the plurality of prizes by applying the index symbol that is aligned with the at least one of the plurality of prizes on the first reel after the first reel reaches the first reel stopping position; and displaying the at least one of the plurality of prizes determined to be awarded.

* * * * *